Jan. 7, 1936. O. KLEINSCHMIT ET AL 2,027,105
MECHANISM FOR SEPARATING THE BOOKS OF AN INTERCONNECTED BOOK PAD
Filed Oct. 21, 1931 12 Sheets-Sheet 2
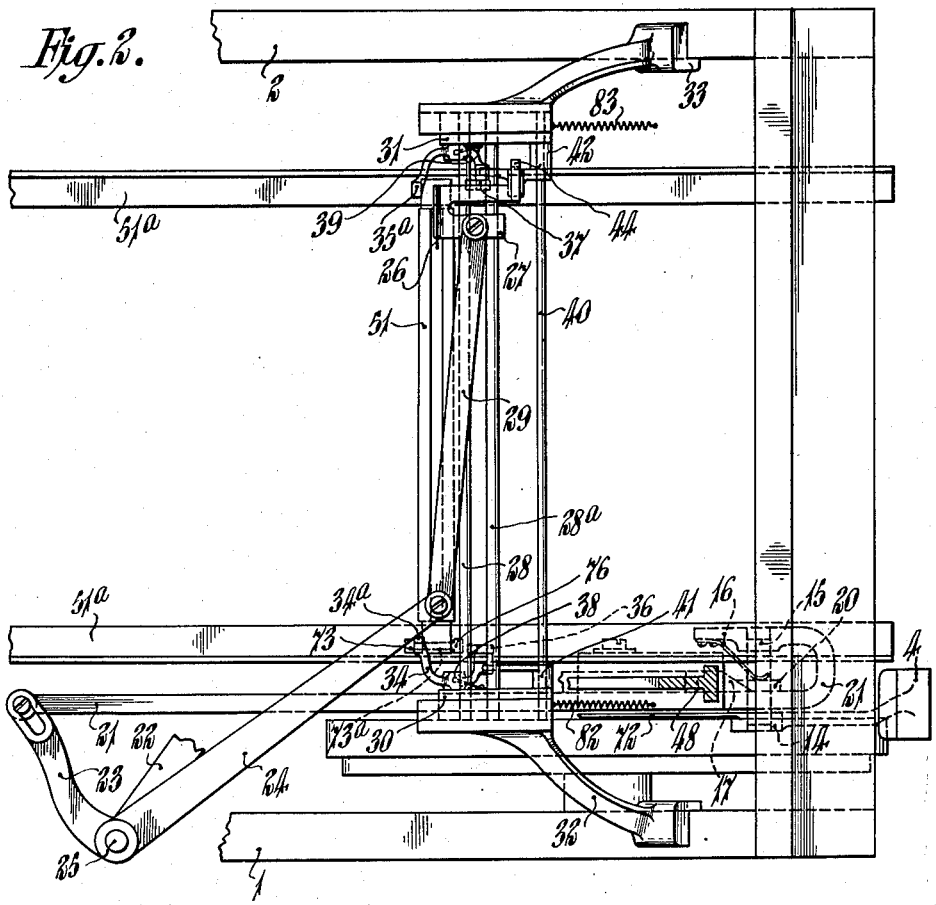
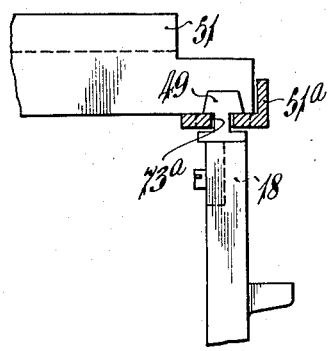
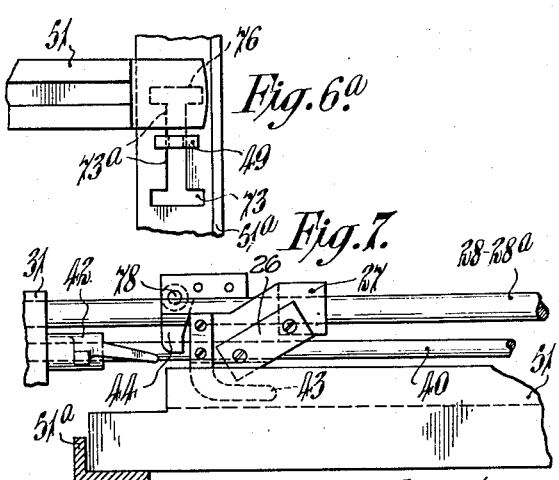

Jan. 7, 1936.  O. KLEINSCHMIT ET AL  2,027,105
MECHANISM FOR SEPARATING THE BOOKS OF AN INTERCONNECTED BOOK PAD
Filed Oct. 21, 1931   12 Sheets-Sheet 3
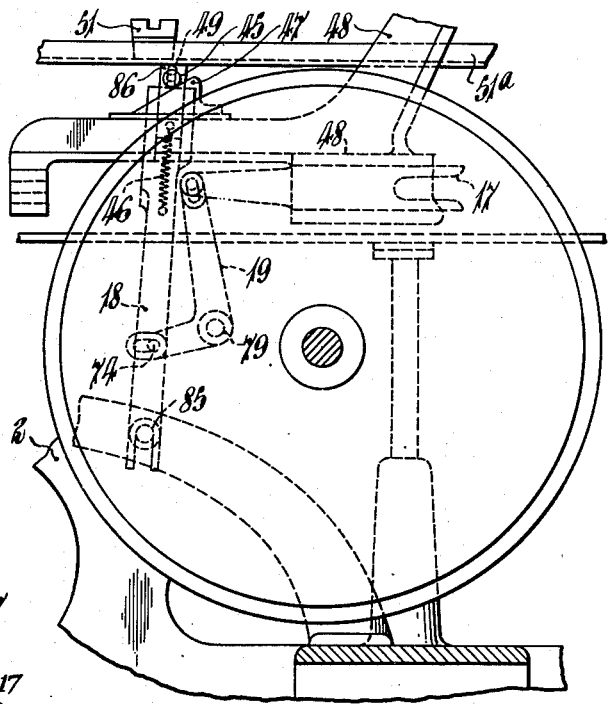
Fig. 3.
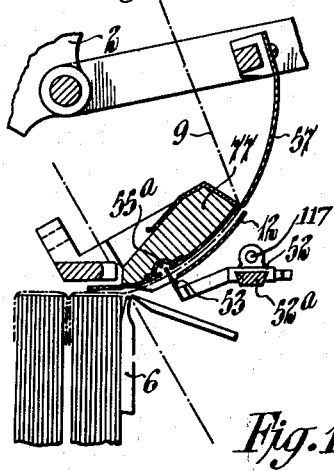
Fig. 15.
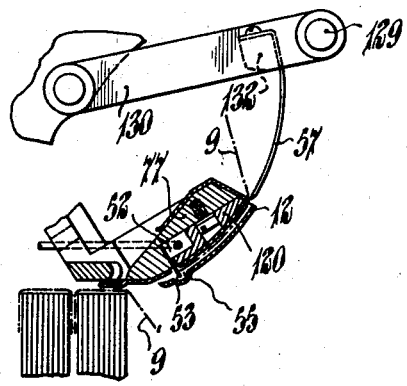
Fig. 10.ª
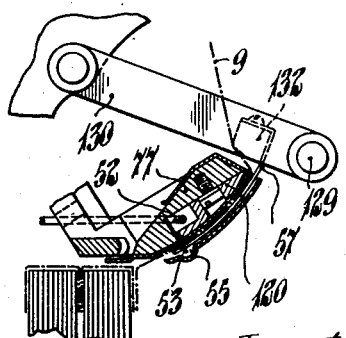
Fig. 11.
Inventors:
Oscar Kleinschmit
and Oskar Müller
By
Attorney.

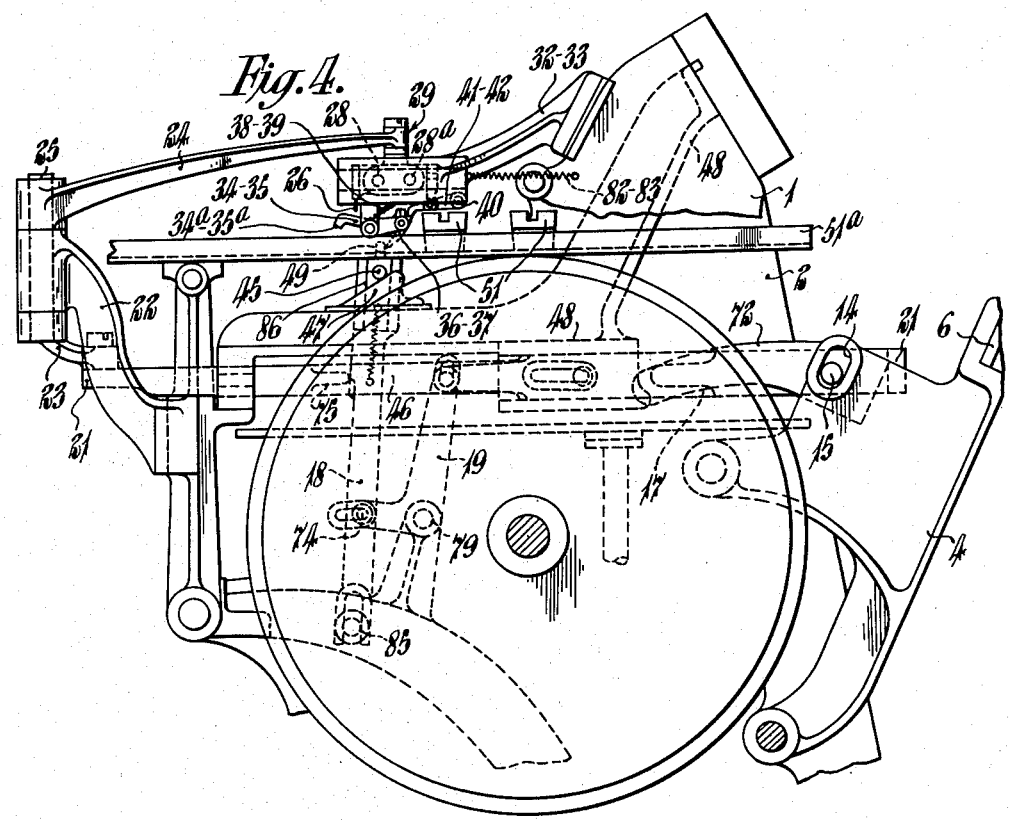
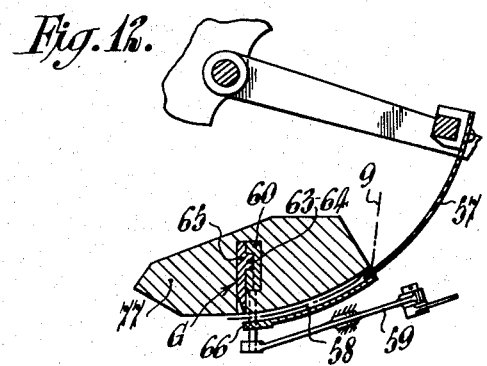

Jan. 7, 1936.  O. KLEINSCHMIT ET AL  2,027,105
MECHANISM FOR SEPARATING THE BOOKS OF AN INTERCONNECTED BOOK PAD
Filed Oct. 21, 1931  12 Sheets-Sheet 5

Inventors:
Oscar Kleinschmit
and Oskar Müller

Jan. 7, 1936. O. KLEINSCHMIT ET AL 2,027,105
MECHANISM FOR SEPARATING THE BOOKS OF AN INTERCONNECTED BOOK PAD
Filed Oct. 21, 1931 12 Sheets-Sheet 7
Fig. 8.ª
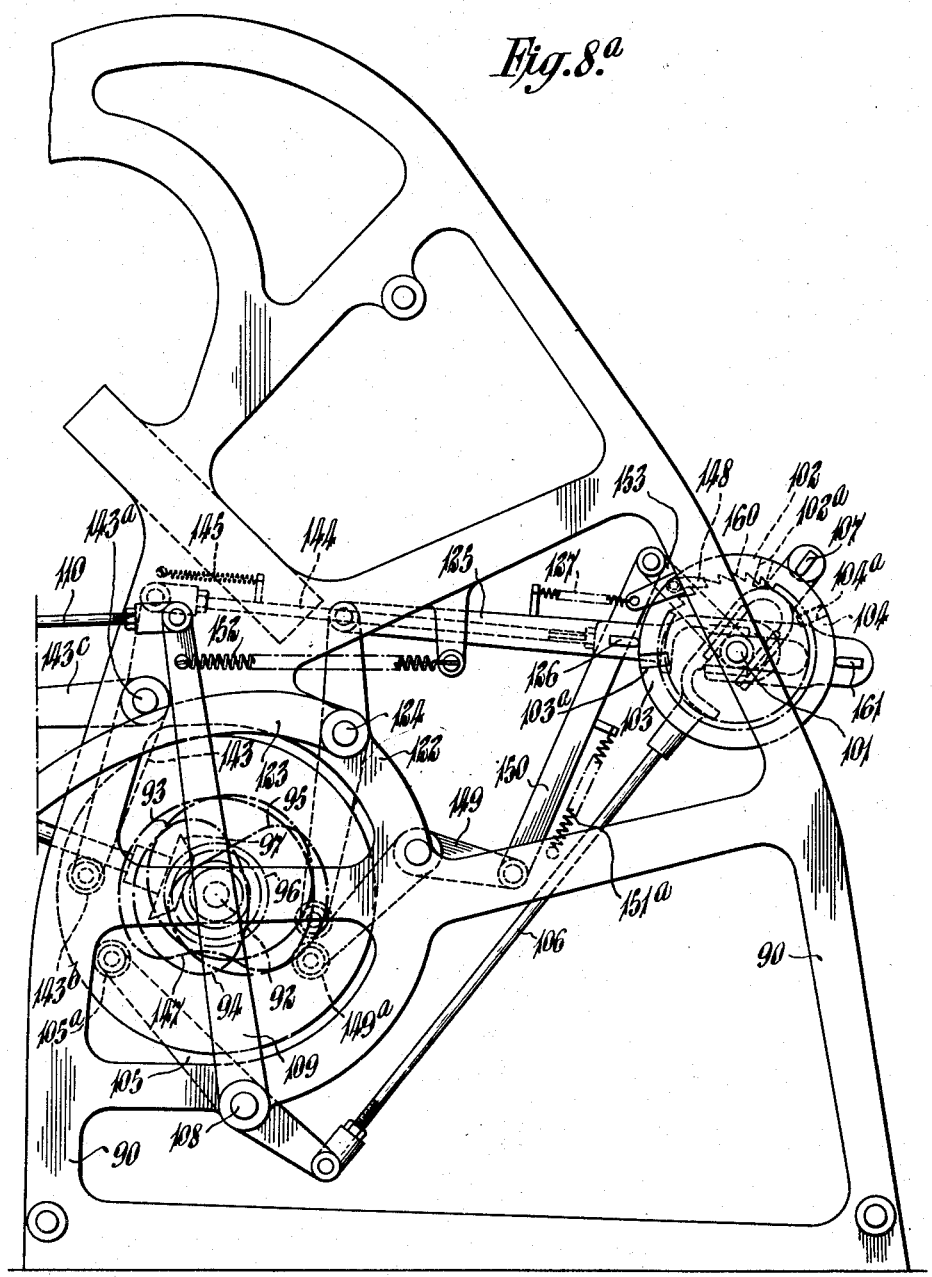
Inventors:
Oscar Kleinschmit
and Oskar Müller
By
Attorney

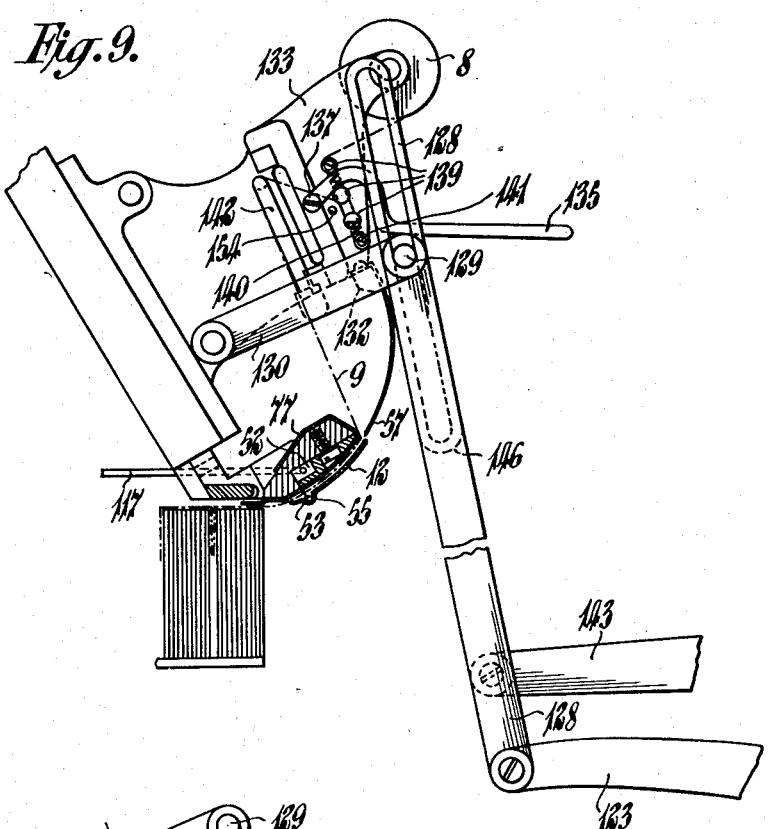
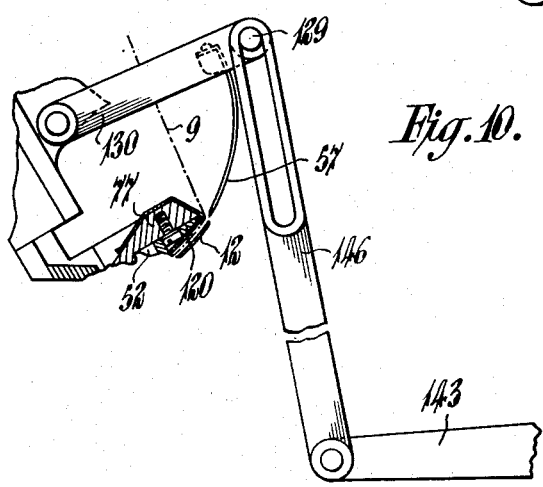

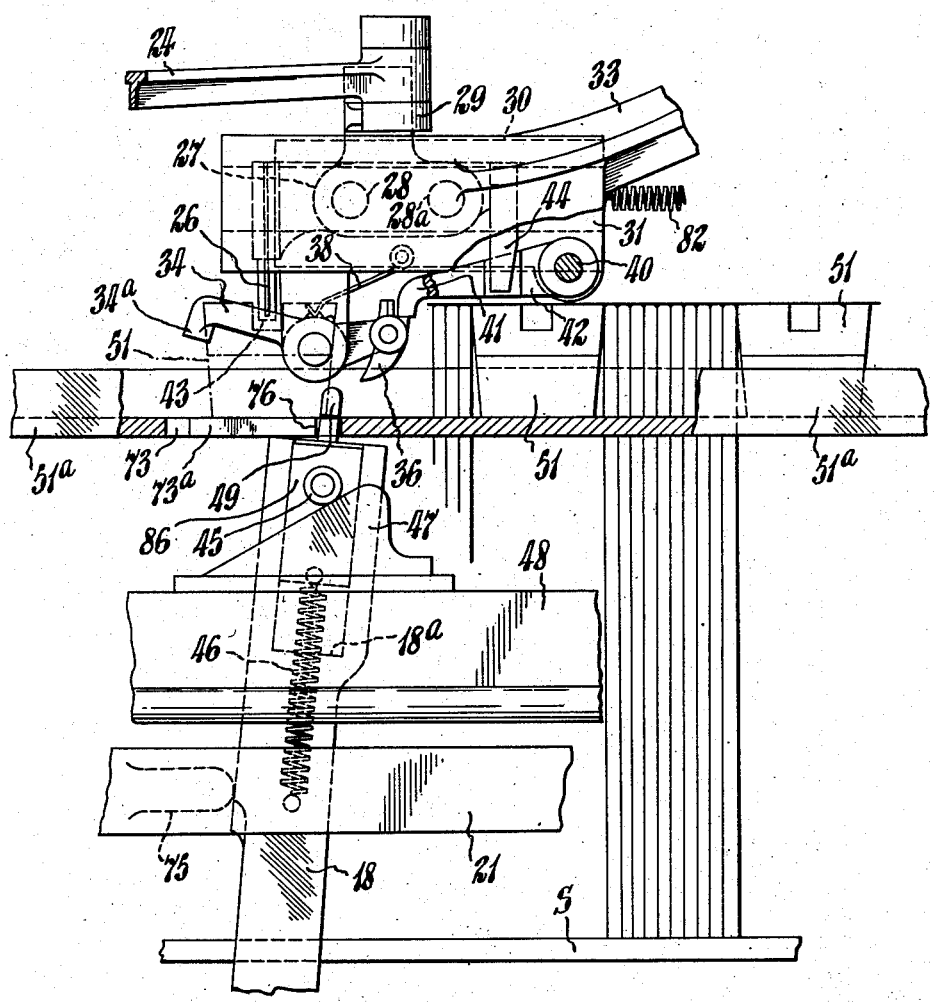

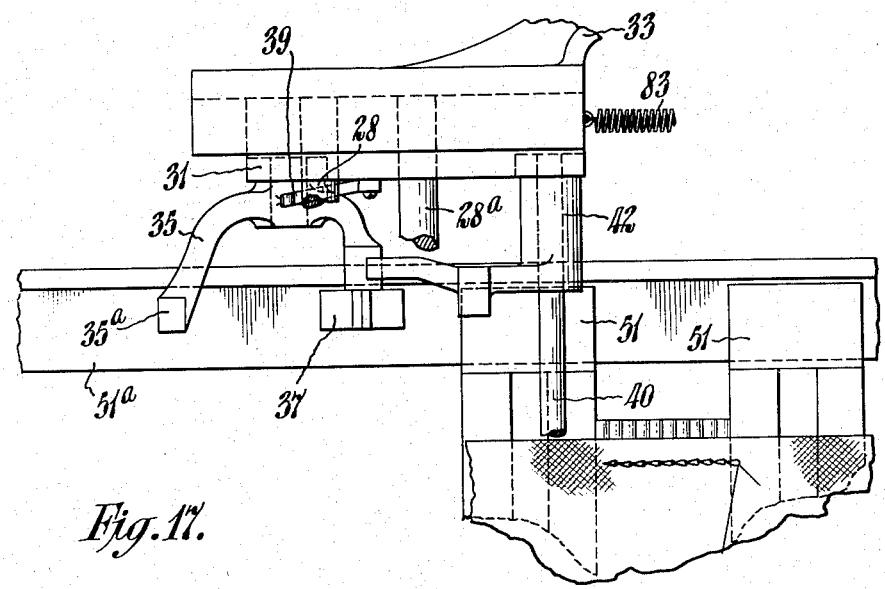
Fig. 17.
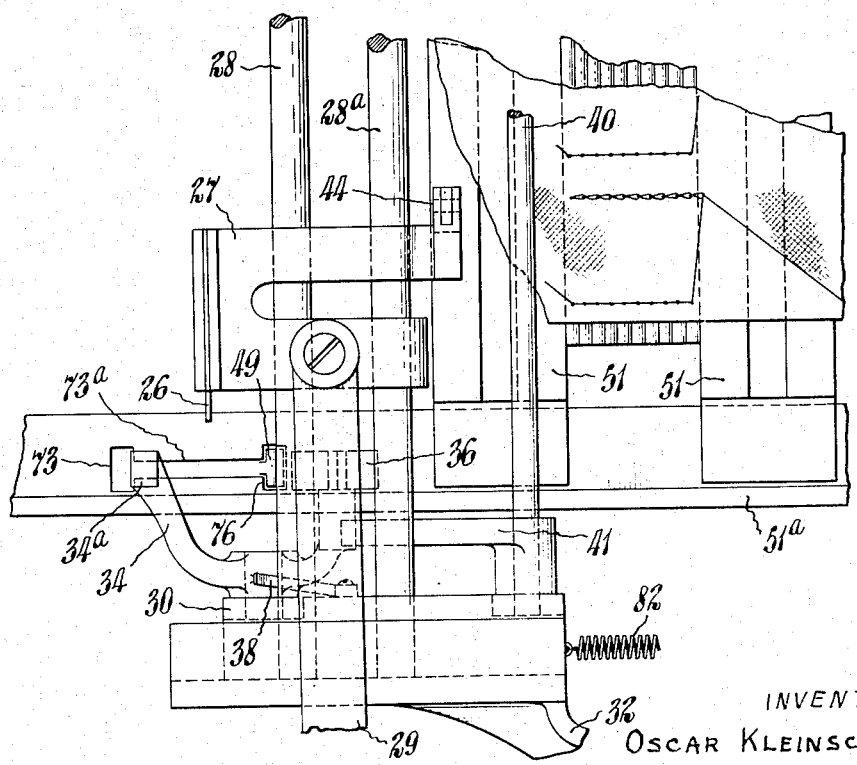

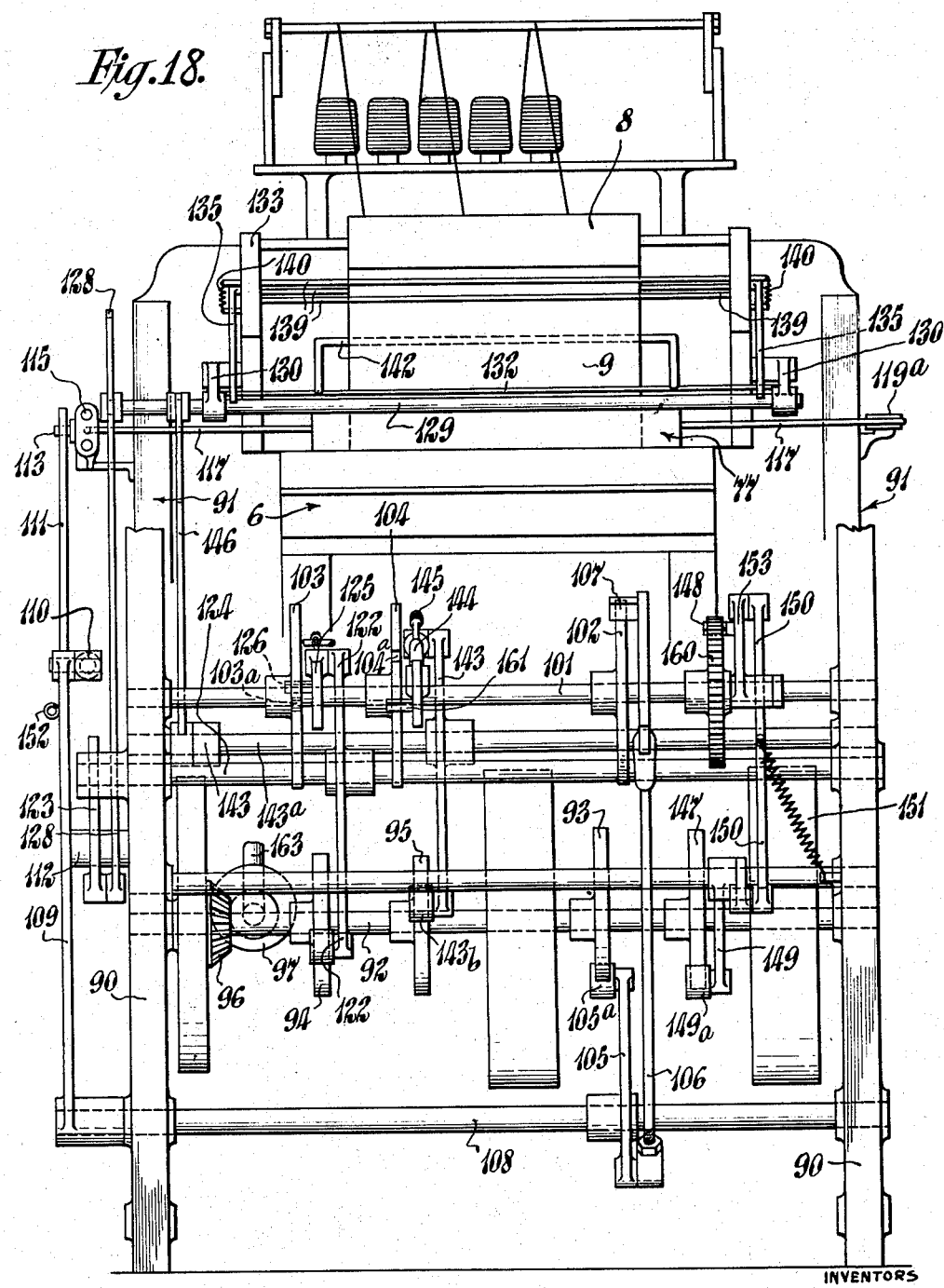

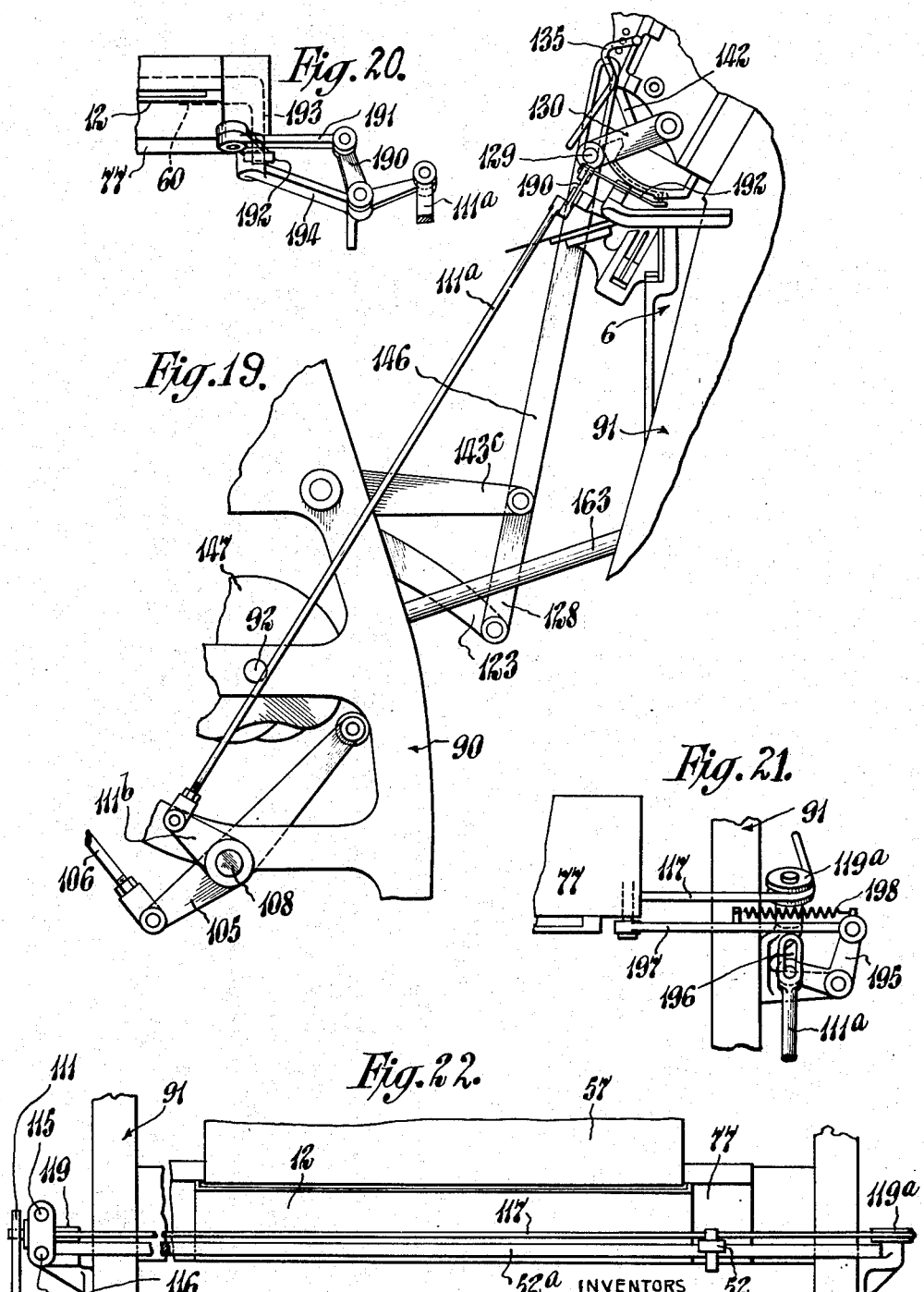

Patented Jan. 7, 1936

2,027,105

UNITED STATES PATENT OFFICE 2,027,105

MECHANISM FOR SEPARATING THE BOOKS OF AN INTERCONNECTED BOOK-PAD

Oscar Kleinschmit and Oskar Muller, Leipzig-Plagwitz, Germany, assignors to Gebruder Brehmer, Leipzig-Plagwitz, Germany, a limited partnership of Germany Application October 21, 1931, Serial No. 570,246
In Germany November 25, 1930

27 Claims. (Cl. 112—21)

The present invention relates to the separation, by mechanical means, of individual books from an inter-connected book-pad and is more particularly concerned with the mechanical separation of books, during or after the binding thereof, from a stitched book-pad to which a backing strip or strips has or have been stitched or otherwise secured.

The separation of books from a stitched book-pad provided with backing material has, hitherto, been performed by hand in practice. The usual manner of carrying out this manual method of separating the books is to insert section or spacing blocks, having the upper surface thereof grooved, between each two completely stitched books during the formation of the book-pad, and then to draw a knife, by hand, along each groove and so sever the interconnecting means between the adjacent books. The insertion of the section blocks serves to space apart, at regular intervals, the completed books and so determines the length of backing strip which is left to overlap the outer cover of each book, when the latter is separated from the pad. Alternatively, the interconnecting threads are severed by mechanical means as described in the co-pending application of Rivlois and Müller, Serial No. 501,128, filed December 9, 1930, and the backing strip which has previously been looped in known manner between the books is severed by manually applied severing means.

According to this invention a method is provided for severing the backing material of an interconnected book-pad in a book-binding machine, whereby a severing member is mechanically contacted with the backing material and severs the latter in a movement transverse thereto.

In order to carry this method into effect, in one form of the invention mechanism is provided whereby the progress of the stitched book-pad from the stitching means is utilized to control the actuation of the mechanical severing and book-separating means.

This severance of the interconnecting binding materials can be effected by means of a severing device which is operated with either a horizontal or vertical movement relatively to the book-pad and the device may be located in any convenient position adjacent to the book-pad. If the severing device is located in front of the advancing book-pad and in the path thereof, the above described section blocks or spacing blocks may be advantageously used to control the actuation of the device. When the severing device is located behind or away from the path of travel of the book-pad, an adjustable control such as a timing device of known type could be used to control the actuation of the device, or alternatively the latter could be controlled, in a suitable manner, from means adapted to engage the idle stitch when such a stitch is provided between the adjacent books in the book-pad. It is also possible to utilize the tensioned backing strip, when the latter is severed, to actuate the controlling means. When any of the last described controlling means are used, the severance may be effected by means of a vertically movable severing device. In this case, the use of section blocks would not be necessary and the device could, if desired, be operated in an upward direction from beneath the book-pad. Mechanism may be provided to enable the severing action to be performed by cutting blades adapted to act in the manner of guillotine blades or if desired rotary slitting knives could be incorporated in the device.

Several constructional embodiments of the invention will now be described with reference to the accompanying drawings in which:

Fig. 2 is a plan view of the book-separating mechanism shown in Fig. 1.

Fig. 3 is a fragmentary elevational view drawn to a larger scale of the means for coupling the book-separating mechanism and the swinging sheet carrier, shown in another position of the operative movement thereof.

Fig. 4 is an elevational view of the book-separating mechanism and sheet-carrier shown in a further operative position.

Figs. 6 and 6a show details, drawn to a larger scale, of the timing control arrangement for the mechanism.

Fig. 7 is an enlarged detail view of the severing mechanism and section-block trip-release.

Figure 8:
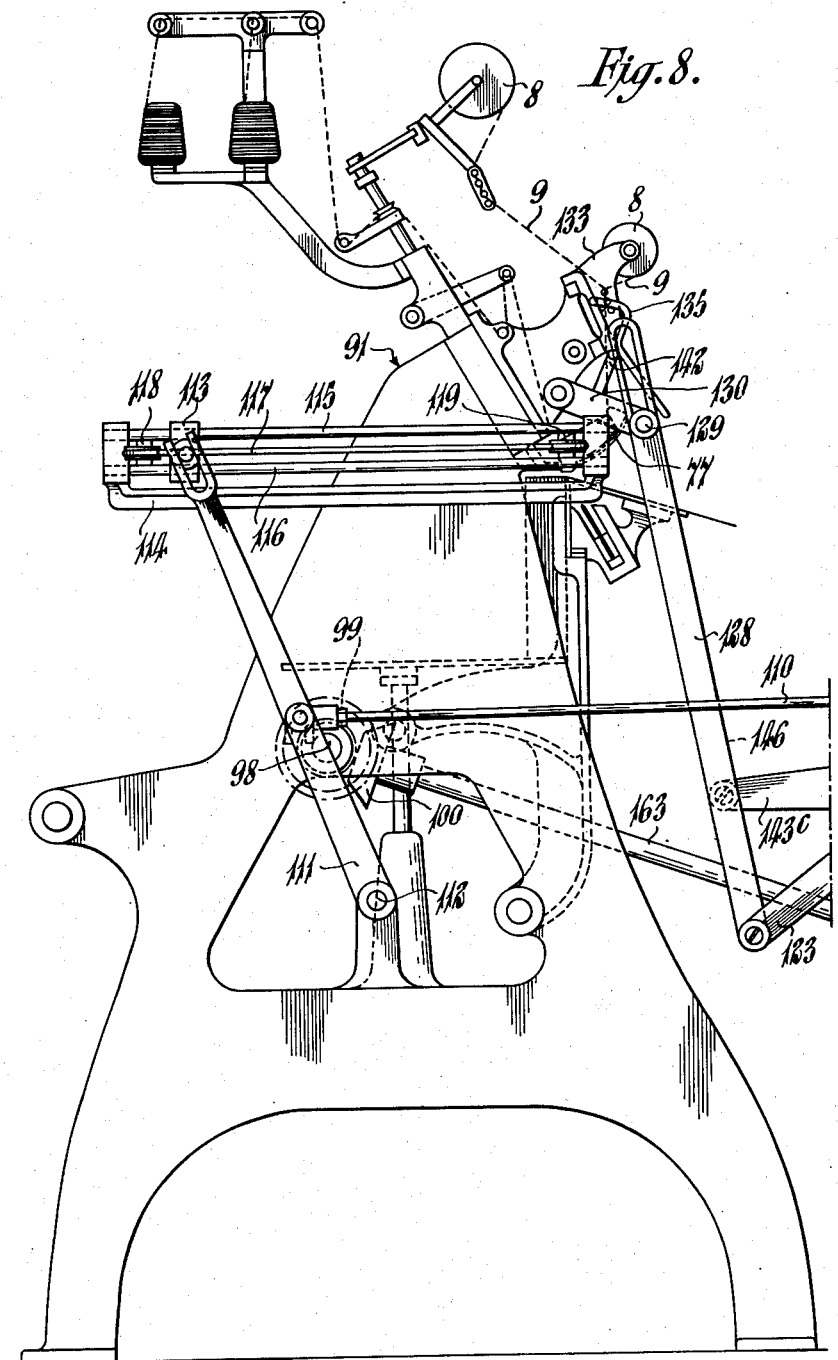

Fig. 8, taken with Fig. 8a, is a side elevational view of the stitching station of a book-stitching machine showing an alternative arrangement of the strip severing apparatus according to this invention together with its associated timing mechanism.

Fig. 9 is a fragmentary view drawn to a larger scale of the alternative strip severing arrangement in a different operative position.

Fig. 10 is a detail of the mechanism for actuating the curved strip-feeding blade.

Figs. 10a and 11 are enlarged detail views showing operative positions of the strip retaining and feeding member forming part of the strip-severing apparatus.

Fig. 12 shows diagrammaticaly, in part sectional side elevation, a further embodiment of strip-severing mechanism constructed according to this invention.

Fig. 13 is an enlarged detail view, in section, of the severing arrangement shown in Fig. 12.

Figure 14:
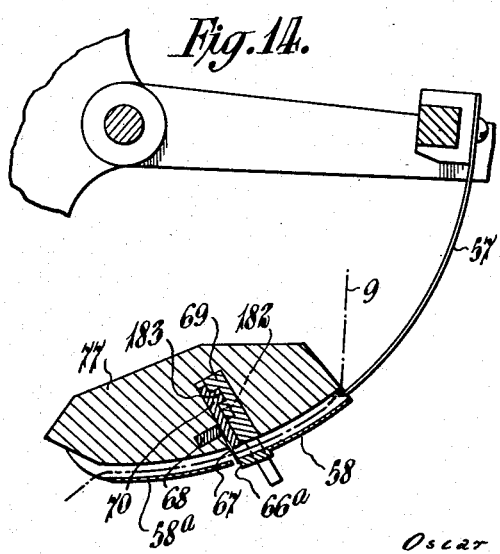

Fig. 14 shows, diagrammatically, a modified construction of the arrangement shown in Figs. 12 and 13, and Fig. 15 is a diagrammatic view of a modified arrangement of the cutting device shown in Figs. 8 to 11. Like references throughout designate like parts of the mechanism.

Fig. 16 is a portion of Fig. 4 drawn in part section and to a larger scale to show more clearly certain features of the mechanism described in the specification and Fig. 17 is a plan view of the mechanism shown in Fig. 16.

Fig. 18 is a front elevation of the machine shown in Figs. 8 and 8a.

Fig. 19 is a fragmentary side elevation similar to Figs. 8 and 8a but viewed from the opposite side of the machine, showing the modified arrangement according to the alternative construction of Figs. 12 and 13.

Fig. 20 is an enlarged detail view of part of Fig. 19.

Fig. 21 is a similar view to Fig. 20 showing the modifications necessary for use with the alternative device as shown in Fig. 14.

Fig. 22 is an elevational view of the alternative arrangement shown in Fig. 15.

Figure 1:
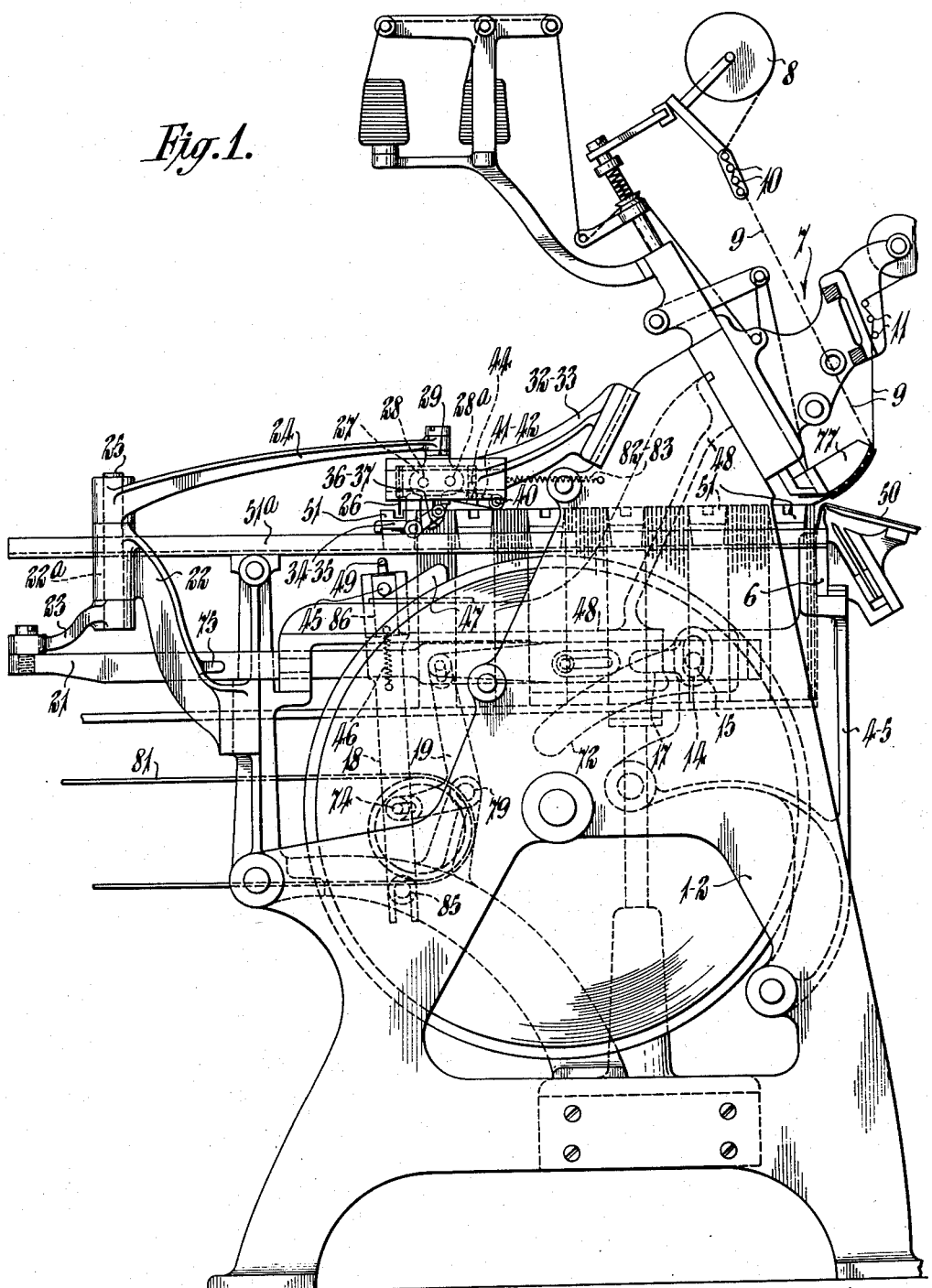
Fig. 1 is a side elevational view of a book-stitching machine of the swinging carrier type provided with book-separating mechanism constructed according to the invention.

Referring to Fig. 1, a book-stitching machine of the swinging sheet-carrier type is shown, by way of example, equipped with the book-separating mechanism according to this invention. The side frames 1 and 2 of the machine serve to support pivotally mounted arms 4 and 5 to which in the usual manner is attached a saddle shaped swinging sheet-carrier 6. The latter member is shown, in Fig. 1, in its top or stitching position and supporting the folded sheet or book-section 50 beneath the stitcher head 7. A combined needle guide and backing strip guide 11 is associated with the stitcher head and serves to position a backing strip 9 above the section 50 so that the stitches inserted in the said section pass through and attach firmly the book section to the backing strip 9 which is fed from the source of supply indicated by the reference numeral 8. The backing strip 9 is suitably tensioned in the usual manner by the tensioning members 10 and 11. The folded sheets or book-sections are thus stitched and, together with the attached backing strip 9, are progressed forward along the usual supporting table or slideways in the form of a continuously stitched book-pad. After the last sheet or section of each complete book is stitched, an idle or locking stitch is formed in known manner and a grooved section block 51 is inserted at this point of the continuous book-pad. The first section of the next book is then fed by the swinging carrier and stitched, and the formation of the book-pad thus proceeds. The section blocks 51 are supported at their extremities on angle-iron runways or rails 51a so that the grooved upper faces of the section blocks are located immediately beneath the stitched backing strip 9.

A horizontal connecting rod 21 extends parallel to the book-pad trough or slideway and below thereof. The rod 21 is slidably mounted in a bearing bracket 48 fixed to the frame 1 and is periodically coupled at one extremity to the swinging carrier-arm 4 by means of a bolt 15 which engages in a slot 14 provided in a flanged portion of the arm 4. The extremity of the rod 21 which carries the bolt 15 is U shaped to provide a suitable bearing for the said bolt 15 (Figs. 2 and 5) which is provided with a cam-faced flange or shoulder 20. A blade spring 16, anchored at one end to the rod 21 engages the shoulder 20 and urges the bolt 15 when free to move into the slot 14.

The coupling of the rod 21 and arm 4 must only be effected when it is desired to sever the backing strip, i. e. after the complete assembly and stitching of each book and, therefore, a de-coupling member 17 having a wedge-shaped extremity is slidably mounted on the connecting rod 21 and adapted to engage the shoulder 20 and normally hold the bolt 15 out of engagement with the slot 14. The member 17 can move relatively to the rod 21 and is influenced by a bell-crank lever 19 to which it is connected. The lever 19 is pivoted at 79 on the machine frame and is adapted to move about this pivot to reciprocate the de-coupling member 17 in timed relation to the movement of the book-pad.

The other end of the connecting rod 21 is pivotally connected to a lever 23 which is rigidly mounted on a pivot pin 25 journalled in a supporting bracket 22 which latter is attached to the machine frame 1. A second lever 24 is also rigidly mounted on the pivot pin 25 and thus partakes of the movement of the connecting rod 21.

A severing member comprising a cutting blade 26 is fastened in a holder 27 (Figs. 2, 5 and 7) which is slidably mounted on guide rods 28, 28a extending above and transversely of the guide-ways 51a and is provided with a pilot member 43 which serves to locate the cutting grooves of the section blocks to ensure the accurate engagement therein of the cutting blade 26. The blade-holder 27 is linked, by means of the rod 29, to the lever 24 and is thus traversed upon the guide rods 28, 28a when the connecting rod 21 and arm 4 are coupled.

The slide rods 28, 28a are mounted in cradles 30, 31 (Fig. 2) which are slidably held in bearing surfaces formed on the supporting arms 32, 33 which are supported by the machine frames 1 and 2 respectively. The blade holder 27 and blade 26 can thus be pulled backwards against a suitable stop by means of spiral springs 82, 83 and are adapted to be carried forward a certain distance by the advancing section block during the severance of the backing strip and the return stroke of the severing device. The means for engaging the block for this purpose comprise two-armed levers 34, 35 which are pivotally mounted on the inner sides of the cradles 30, 31.

As shown more clearly in Figs. 16 and 17, the forwardly extending arms of the levers 34, 35 are provided with lugs 34a, 35a respectively adapted to engage and hold the section block, while the rearwardly extending arms of the levers 34, 35 carry cam-faced lugs 36, 37 respectively which project downwardly into the path of travel of the said section blocks. The levers 34, 35 are spring-controlled by the blade springs 38, 39 and, when rocked about their respective pivots, they remain in the position to which they have been tripped until engaged and rocked by further tripping members as hereinafter described.

Normally, the cam-faced lugs 36, 37 project into the path of travel of the section blocks and the section-block engaging lugs 34a, 35a are raised therefrom.

A shaft 40 is also rotatably mounted in the cradles 30, 31 transversely of the section-block guides 51a, and has mounted thereon two tripping levers 41, 42 (Figs. 1, 2 and 7). The lever 42 comprises a two-armed lever having one arm extending into the path of travel of the blade holder 27 and the second arm thereof adapted to engage the corresponding rearwardly extending arm of the lever 35, while the lever 41 engages the rearwardly extending arm of the lever 34. A lug 44, downwardly projecting from the blade-holder 27, is adapted to engage the lever 42 at the end of the return stroke of the blade 26 after the cutting movement of the latter, and thus cause the said lever 42 to depress the rearwardly extending arm of the lever 35 and so rock the latter about its pivot to disengage, from the foremost section block 51, the retaining lug 35a. It follows that, through the movement of the shaft 40, a similar action will take place between the members 41, 34 and 34a so that the lugs 34a and 35a are simultaneously lifted at the right moment to release the section block 51 held thereby.

The automatic coupling or de-coupling of the connecting rod 21 and sheet-carrier 6 is controlled in the following manner. The second arm of the bell-crank lever 19 is slotted to receive a pivot pin 74 by which it is pivotally connected to a substantially vertical lever 18 which, at its lower extremity, is slotted to engage a further pivot pin 85 secured to the frame of the machine. The lever 18 which is free to move in any direction in its substantially vertical plane carriers, at its upper end, a finger 49 (Figs. 1, 3 and 4). The finger 49 is adapted to pass through either of the slots 73, 76 which are formed in the left-hand runway 51a and connected by a throat or slit 73a through which the upper flange of the pin 49 cannot pass (see Figs. 6, 6a). A separate member 86, upon which is journalled a cam follower 45, is slidably mounted on the upper part of the lever 18 the two being linked together by a spiral spring 46 which tends to draw the member 86 down upon a stop provided on the lever 18 (Figs. 1 and 4). A cam-faced block 47, supported by the bracket 48, is arranged to engage the follower roller 45 so that during the rearward movement of the lever 18 about the pivot 85 the member 86 is lifted and thus, if the lever 18 is held against lifting, the spring 46 is placed under tension.

A shoulder or lug 75, adapted to engage during its rearward movement the lever 18, is secured to the connecting rod 21. The sheet-carrier arm 4 is provided with a curved guard member 72 the purpose of which will hereinafter be described.

During the normal stitching operation upon the book-sections constituting one book, the connecting rod remains de-coupled from the swinging carrier 6 and the finger 49 projects upwards through the slot 76 or resting its flange across the slit 73a.

The complete cycle of operation of the above described mechanism is as follows:

During the stitching of the book-pad and backing strip attached thereto, the section blocks 51 are inserted as above described and the book-pad together with the interposed section blocks is progressed along the trough or slideway. The stepped extremities of the section blocks travel along the runways 51a and, in due course, the foremost section block, i. e., that placed in the book-pad after the first complete book, encounters the finger 49 projecting through the throated slot 73a formed in the left-hand runway 51a as shown in the drawings.

By the continued travel of the block 51 the finger 49 is pushed forward along the throated slot 73a and finally registers with the slot 73. Under the influence of its own weight the lever 18 thereupon drops downwardly upon its pivot 85 and so withdraws the finger 49 from the slot 73 while the slide member 86 is drawn down to its stop by the spring 46. The downward movement of the lever 18 turns the bell-crank lever 19 about its pivot 79 so that the de-coupling member 17 is drawn forward and releases the bolt 15 which, under the influence of the blade spring 16, is caused to enter the slot 14 and so couples the connecting rod 21 and sheet carrier 6. The position of the mechanism at this point of the operation is shown in Fig. 1. At the same time, the stepped extremities of the foremost section block move under and engage the downwardly projecting lugs 36, 37 of the levers 34, 35 and thus rock the latter about their pivots by pressing the lugs upwardly. By this movement of the levers 34, 35, the block-engaging lugs 34a, 35a are tripped into the path of travel of the section block which engages therewith and, in its travel, carries forward the slidably mounted cradles 30, 31 and the whole strip-severing mechanism supported thereby. Thus, during the whole of the movement of the strip severing member the strip severing mechanism remains registered with the section block.

The coupling of the connecting rod 21 with the sheet-carrier 6 is timed to take place when the latter has reached its top or stitching position, as shown in Fig. 1, and to guard against the premature release of the bolt 15 before the slot 14 has registered therewith, the guard 72 is provided. This member is arranged to withhold the bolt from its forward engaging movement until the slot 14 is correctly registered.

Figure 5:
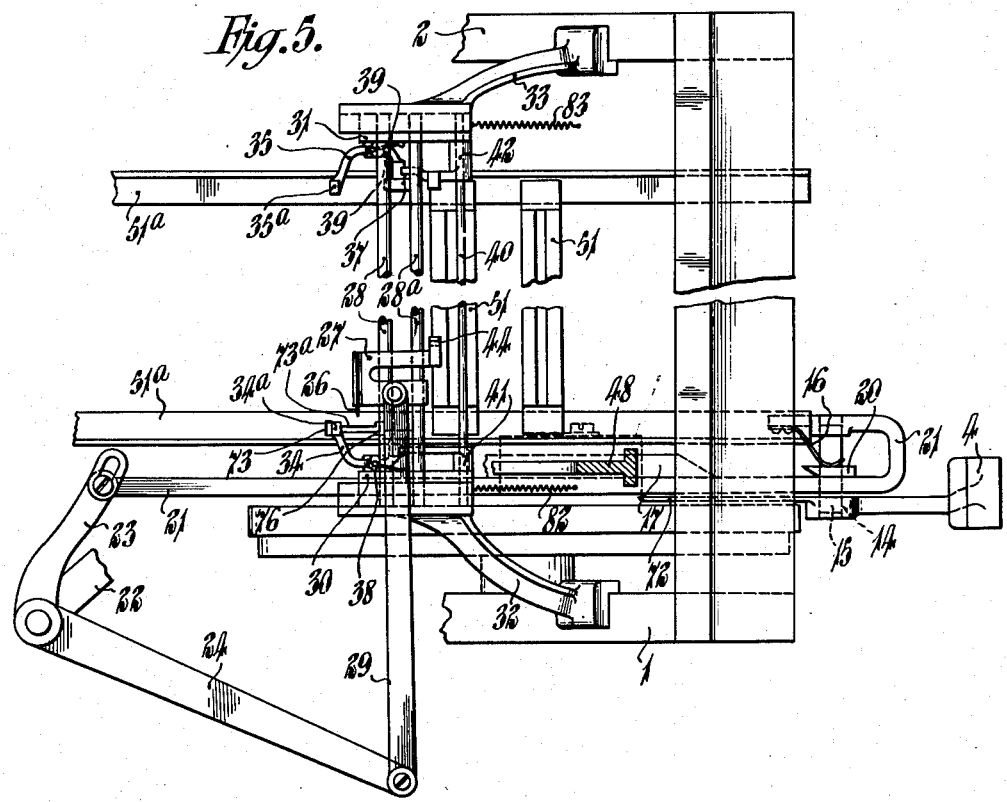
Fig. 5 is a plan view thereof.

The subsequent idle movement of the sheet-carrier 6 draws the now coupled connecting rod 21 rearwards and the movement of the latter member, through the levers 23, 24 and 29 serves to move the strip separating device transversely across the book-pad from right to left, i. e. from the position shown in Fig. 2 to that shown in Fig. 5. In this movement the pilot member 43 first enters the cutting groove of the section block now suitably positioned and so correctly guides the blade 26 in its cutting movement. By the movement of the latter across the section block, the backing strip, associated gauze and securing threads if need be, are completely severed at this point and the foremost book freed from the pad.

During the latter part of the rearward working stroke of the rod 21, the projection or lug 75 carried thereon engages the lever 18 and rocks the latter rearwards about the pivot 85. In this movement of the lever 18 the cam follower roller 45 carried by the slide member 86 is forced to follow the inclined face of the stationary cam block 47 and since the finger 49, which has by now been moved away from the slot 73, cannot move upwards through the throat 73a the spring 46 is placed under tension. At the end of the rearward travel of the rod 21, the finger 49 registers with the slot 76 and thereupon, urged by the spring 46, the finger and lever 18 are lifted and the finger 49 passes through the slot 76. When the lever 18 is again moved forward slightly the narrow portion of the finger 49 moves into the throat 73a and, owing to the flanged upper portion of the finger 49 which cannot pass through the throat the lever 18 is held in the raised position. By the upward movement of the lever 18, the bell-crank lever 19 is again rocked to move the de-coupling member 17 into position to engage the shoulder 20 of the bolt 15.

In the next feeding movement of the swinging sheet-carrier 6 the connecting rod 21 is reciprocated and through the linkage 23, 24 and 29 the strip severing device is returned to the right-hand side of the trough as shown in Fig. 2. Since the return movement of the strip severing device takes place during the feed and stitching of another book section it follows that during this return movement the book-pad will advance in the trough. This movement is compensated by the forward sliding movement of the severing device as a whole, as above described, so that while the blade 26 is passing through the groove in the section block the severing member and book-pad move together.

At the end of the return stroke of the severing device, the lug 44 engages the trip lever 42 whereby, as above described, the block retaining lugs 34a, 35a are caused to release the block and allow the stitched pad to continue its progress. The cradles 30, 31 are drawn backwards against their stops by the springs 82, 83 and thus the cycle of the strip severing operation is completed and the mechanism restored to await the engagement of the pin 49 by the next advancing section block.

In the above described embodiment the severance of the backing strip is effected after the stitching of the corresponding books and it has the advantage that the books are held together when passing along the trough of the machine after stitching. A further advantage of this method is that the books of the stack when progressed in the form of a stitched book-pad are submitted to an even and steady pressure which is desirable for the production of efficient stitching.

However, it is sometimes desired, especially when idle stitches are not utilized between the stitched books of the book-pad, to dispense with the use of the section blocks when severing the backing strip and for this purpose, as is well-known in the art, means are provided for looping the backing strip between each two books before severing the same by hand. In Figs. 8 to 14 of the appended drawings, means are shown for mechanically severing and lapping, without the use of section blocks or looping devices, the backing strips applied to a continuously stitched book-pad.

Referring to Figs. 8 to 11, in which one form of severing means is diagrammatically shown, the combined stitching-needle guide and strip guide 77 is adapted for this purpose by the provision of an auxiliary strip guide 12 and the formation of a transverse slot 55 in the face of the said strip guide 77. A strip severing blade 53 supported by a holder 52 is adapted to reciprocate in the said slot 55 and so sever the backing material 9 when desired.

Referring to Figs. 8 and 8a, taken together an auxiliary frame 90 is associated with the stitching machine indicated generally by the reference numeral 91 and serves to support the timing mechanism and some part of the actuating mechanism connected to the strip severing device which latter is associated with the combined needle guide and strip guide 77 forming part of the stitching machine 91.

As shown more clearly in Fig. 9, the guide 77, which is positioned as is usual beneath the stitcher heads of the machine, is recessed on its under surface and transversely thereof to provide a seating and slideway for the blade holder 52. The latter is retained in its operative position by means of the screwed angle bracket 120 and is adapted to slide freely in its slideway so as to traverse the blade 53 in the slot 55.

The transverse movement of the members 52 and 53 is imparted thereto from a slide block 113 slidably mounted on guide rails 115, 116 which are supported at their extremities by a bearing bracket 114 secured to the machine frame and positioned so that one extremity thereof is adjacent the strip severing device.

Two horizontal grooved pulleys 118, 119 are journalled at either extremity of the bearing bracket 114 between the rails 115, 116 and are mutually aligned with a third grooved pulley 119a positioned on the further side of the strip guide 77.

A rope or wire cable which is secured at one extremity to the slide block 113, is passed round the pulley 118 then led to the pulley 119, passed round the latter and then through the guide member 77 where it is attached to the blade holder 52 and finally is led round the third pulley 119a and so back to the slide block 113 to which the other extremity of the rope or cable is then secured. Thus when the slide block is moved along the guide rails 115, 116, reciprocatory movement is imparted to the blade holder 52 and blade 53.

The auxiliary strip guide 12 shaped as shown in Figs. 8 and 9 is positioned closely adjacent the curved face of the combined strip guide and needle guide 77 and between the said curved face and the auxiliary strip guide 12 a curved strip-feeding and retaining blade 57 is adapted to move.

Two arms 130 (of which one is shown in Figs. 8 and 9) are pivoted to the frame of the stitching machine on the opposite sides thereof and serve to support a transverse bar 132 to which is secured, downwardly projecting therefrom, the strip-feeding blade 57. The latter, when moved is adapted to engage the backing strip 9 adjacent its free end and feed the said strip forward to its correct position of application to the back of the book.

The backing strip 9, as in the first described embodiment is fed from a source of supply indicated by the reference numeral 8 and is guided between the curved guide 12 and needle guide 77 to the requisite stitching position above the back of the book-pad.

In this construction, however, the strip tensioning means comprise a grid formed by a series of spaced transverse bars 139 and a strip tensioning bridge piece 142 which latter is carried by the arms 130.

The extremities of the bars 139 are slidably mounted in upper extensions of the machine frame and are resiliently linked ogether and also anchored by the tension spring or springs 140 to the machine frame as shown at 141 (Fig. 9).

A pair of shaped levers 135, one of which is shown in Figs. 8 and 9, are pivoted to the machine frame on the outside thereof and pass beneath the extremities of the uppermost bar 139 which extend outwards beyond the supporting frames. As shown in the drawings the bars 139 receive the backing strip as the latter passes from the source of supply 8 to the tensioning bridge 142. The levers 135 extend outwardly from the machine to engage the transverse bar 129 carried by the arms 130, while the backing strip extends downwardly from the tensioning arch 142 to the combined needle guide and strip guide 77: Stops 154 are provided on the machine frame to limit the downward movement of the levers 135.

The strip severing device and the strip feeding device are actuated from the machine drive by automatically timed mechanism in the following manner.

A cam-shaft 92 (Fig. 8a) is journalled in the auxiliary frame 90 and is provided with a bevel gear wheel 96. The main drive shaft 98 of the stitching machine is fitted with a similar bevel gear wheel 99 and an inter-drive shaft 163 carries bevel gear wheels 97 and 100 which mesh with the gears 96 and 99 respectively and are of equal ratio. The cam-shaft 92 which is thus constantly driven from the stitching machine drive at the same speed has mounted thereon the cam eccentrics 93, 94, 95 and 147.

A timing shaft 101 is also journalled in the auxiliary frame and carries the notched or slotted discs 102, 103 and 104. The shaft 101 is driven from the eccentric 147 by means of the bell-crank lever 149 pivoted to the auxiliary frame, a pitman 150 linked at one extremity to one arm of the bell-crank lever 149 and a pawl lever 153 pivotally mounted on the shaft 101 and linked to the other extremity of the pitman 150. The other arm of the bell-crank lever 149 carries a cam follower adapted to engage the cam face of the eccentric 147.

The pawl lever 153 carries a pawl 148 adapted to engage the teeth of a ratchet wheel 160 fixedly mounted on the shaft 101. A tension spring 151a secured to the arm 150 and anchored to the auxiliary frame 90 holds the cam follower 149a in engagement with the eccentric 147 and movement is thus imparted step-by-step to the shaft 101 and cam eccentrics carried thereby.

A two arm lever 105 mounted on a pivotal shaft 108, journalled in the auxiliary frame 90, carries at one extremity a cam follower 105a adapted to engage the cam eccentric 93. The other arm of the lever 105 is linked to a connecting rod 106 provided at its upper extremity with a recessed or slotted slide adapted to embrace the shaft 101 and a lug 107 of requisite size and shape to enter, when registered therewith, a slot 102a formed in the circumferential edge of the disc 102. An upwardly extending lever 109 rigidly mounted on the shaft 108 is linked by means of a connecting rod 110 to a pivotal lever 111 pivoted at its lower extremity on a pivot 112 mounted in the frame of the machine 91. The upper extremity of the pivotal lever 111 is bifurcated to engage a pin projecting from the slide block 113 and so reciprocates the said slide block when movement is imparted by the above described linkage by the cam eccentric 93. A spring 152 secured to the lever 109 and anchored to the auxiliary frame 90 pulls the lever 109 to the right (as viewed in Fig. 8a) when permitted by the timing mechanism to do so and so rocks the lever 111 to actuate the strip severing device as above described and at the same time holds the cam follower 105a in contact wtih the cam eccentric 93. It is obvious that the linkage will be held against movement, i. e. against following the throw of the cam 93, until the lug 107 registers with the slot 102a of the revolving disc 102.

The above described strip tensioning devices are controlled from the timing mechanism by means of a two-armed lever 122 mounted on a pivotal stub shaft 124 journalled in the machine frame and having rigidly secured thereto a third lever 123 which is linked to an upwardly extending connecting rod 128 which latter is slotted at its upper extremity freely to engage the bar 129. One arm of the pivotal lever 122 carries a cam follower adapted to engage the eccentric 94 while the other arm thereof is linked to a slide bar 125 which is provided with a slotted slide member adapted to embrace the shaft 101. The last mentioned slide member is formed with a locking lug 126 which engages when registered therewith in a slot 103a formed in the disc 103. A spiral spring 127 attached to the slide bar 125 and anchored to the auxiliary frame imparts, when permitted by the timing mechanism, an upward movement to the arm 123 and connecting rod 128 which latter thus lifts the bar 129 to engage and lift the levers 130. When functioning in this manner the spring 127 also urges against the eccentric 94 the cam follower of the lever 122.

The actuating means for the strip feeding and retaining blade member 57 comprises a two-armed lever 143, mounted on a pivotal shaft 143a journalled in the auxiliary frame 90, having one arm provided with a cam follower 143b adapted to engage the cam eccentric 95. The other arm of the lever 143 is connected to a slide bar 144 which is provided with a slotted slide member adapted to embrace the shaft 101 and carrying a lug or projection 161 which latter engages, when registered therewith, in a slot 104a formed in the circumferential face of the disc 104. A third arm 143c is rigidly mounted on the pivotal shaft 143a and extends to link with a connecting rod 146 which extends upwardly and is slotted at its upper extremity to engage the rod 129. An appropriate movement of the connecting rod 146 will rock the curved blade member 57 from the position shown in Fig. 9 to that shown in Fig. 8 and such movement is imparted to the said connecting rod by means of a spring 145 which is secured to the slide bar 144 and anchored to the auxiliary frame 90. The spring, when permitted by the timing mechanism to function, also urges the cam follower 143b into contact with the eccentric 95.

The operation of this embodiment of the invention is as follows:

During the stitching in known manner of the book-signatures the cam-shaft 92, through the machine drive shaft 98, is given a complete revolution for each signature stitched and consequently steps the timing shaft 101 round by one tooth of the ratchet wheel 160. This movement is repeated during each stitching operation until the last section of each book is stitched. At this point of the operation the slotted disc 103 on the shaft 101 has been rotated sufficiently to register the slot 103a with the lug 126 carried on the slide bar 125 thus enabling the spring 127 to function and so move the connecting rod 128 in an upward direction. The latter member engages the lower edges of its slot with the bar 129 and so lifts the latter from the position shown in Fig. 8 to that shown in Fig. 9. The bar 129 is thus caused to engage the shaped levers 135 and move them upwardly about the pivot 138 and away from the stops 154. The curved portions of the levers 135 in turn engage the outwardly projecting extremities of the uppermost tensioning bar 139 and so lift these grid bars 139 against the action of the springs 140. Bars 139 are actuated to release the tension on the backing material 9 before the downward movement of the tensioning bridge 142 and the backing strip or other material is left lying more or less loosely on the said tensioning bridge during the severance of the backing strip and the downward movement of the tensioning bridge.

The rod 128 now commences to move downwards in accordance with the rotation of the cam eccentric 94 and in the same movement of the last mentioned eccentric the lug 126 is withdrawn from the slot 103a. Due to the lost motion connection provided by the slot in the extremity of the connecting rod 128, the levers 130 together with the bar 129 and the levers 135 remain in the position shown in Fig. 9, despite the descent of the rod 128, while by the continued rotation of the shaft 101 the slide bar 125 and rod 128 are again held by the edge of the disc 103 from further movement.

At this point of the operation the eccentric 102 on the shaft 101 has been rotated sufficiently to register the slot 102a with the lug 107 mounted at the extremity of the connecting rod 106. By the entry of the lug 107 into the slot 102a the spring 152 is permitted to function so as to draw forward the slide block 113 on the guide rails 115, 116. The severing blade 53 is thus traversed in the groove 55 and so drawn across the backing strip 9 to sever the latter. Since the tension of the backing strip 9 has previously been released as above described, the severed end thereof leading down from the supply 8 remains positioned between the curved guiding surface of the member 77 and the auxiliary guide 12 as shown in Fig. 10a.

The continued rotation of the eccentric 93 then restores the cutting blade 53 and the associated parts of the cutting device to the initial position. That is to say the blade 53 is given a complete reciprocatory movement while the lug 107 is withdrawn from the slot 102a and, by reason of the now continued movement of the disc 102, is held against the edge of the said disc.

By this continued rotation of the shaft 101 the disc 104 is rotated sufficiently to register the slot 104a with the lug 161 carried by the slide bar 144 and so allow the said lug to enter the slot 104a whereby the spring 145 is permitted to function and so rock the crank-arm 143 about its pivot 143a, to pull the connecting rod 146 downwards.

In the downward movement of the connecting rod 146, the upper edge of the slot formed therein engages the bar 129 and so moves the latter and the arms 130 in a downward direction (Fig. 8). The downwardly extending curved strip-feeding blade 57, secured to the bar 132 which latter is supported by the arms 130, is also moved downwardly to enter between the curved face of the strip guide 77 and the auxiliary guide 12. In the downward movement of the tensioning arch 142, which is supported by the arms 130, the backing material or strip is loosened and upon being engaged by the forward edge of the curved blade 57, is pushed between the guides 77 and 12 to the position shown in Fig. 11. In this position the strip is ready to receive the first section of the next book to be stitched and it will be plainly seen that the backing strip is suitably overlapped to lie along the lateral outside edges of the said book.

By the continued rotation of the eccentric 93 the connecting rod 146 is restored to the position shown in Fig. 9 but owing to the lost motion connection provided by the slotted extremity of the said rod 146 the bar 126, arms 130, bar 132 and strip-feeding blade 57 remain in the position shown in Figs. 8 and 11. The lug 161 is also withdrawn by the rotation of the cam eccentric 93 and the shaft 101 during the now commenced stitching of the next book is further rotated and so locks the shaft 144 and conecting rod 146 against movement.

The member 57 remains in this position until the stitching of the last signature of the book now being formed and the above described cycle of operations is repeated.

In the last described embodiment the cutting blade 53 is shown disposed in the needle guide 77 but it will readily be appreciated by reference to Figs. 15 and 22 that, by a slight alteration of the arrangement of the mechanism, the severing blade 53 could be arranged to operate on the outside of the said needle guide.

In this construction the said needle guide and strip guide 77 is provided with a transverse groove on its curved undersurface and the auxiliary strip-guide 12 is slotted to permit the entry and operative movement of the severing blade 53 which is held by a carrier 52 slidably mounted on a transverse guide 52a. The actuating and timing mechanism is precisely similar to that above described in reference to Figs. 8 to 11.

Referring to Figs. 12, 13, 19 and 20, a further embodiment of the invention is diagrammatically illustrated.

The strip severing mechanism shown forms part of a machine similar to that shown in Fig. 8. In this construction the needle guide and strip guide 77 is slotted transversely thereof to form guideways for a guillotine device G shown more clearly in Fig. 13. A curved auxiliary strip guide 58 is positioned adjacent the strip guiding face of the member 77 and is provided with a straight machined edge 66 extending transversely of the strip guide and forming one cutting edge of the guillotine G.

The last mentioned device comprising a horizontal transverse slide bar 60, provided with oblique slots 61, 62, is mounted in the slotted guideway of the member 77 and is adapted to be reciprocated by the timed mechanism shown in Fig. 8. A guillotine cutting blade 65 is also positioned in the guideway of the member 77 and carries lugs 63, 64 which engage in the slots 61, 62 respectively and the blade is guided to move in a vertical direction only. As in the second described embodiment the backing strip 9 is fed mechanically between the members 77 and 58 and so moves into position to receive the sections of the book about to be stitched, that is to say, the strip engaging and feeding member 57 is timed to engage and advance the strip as desired.

It will be obvious that when the slide bar 60 is moved from right to left (as viewed in Fig. 13) the blade 65, by reason of the movement of the lugs 63, 64 in the oblique slots 61, 62, is forced downwards to engage between its cutting edge and the edge 66 the backing strip 9 which is passing therebetween.

The backing strip is thus severed and when necessary the strip-feeding blade 57 is moved downwards to feed the backing strip formed to receive the first section of the next book to be stitched.

The operation of the slide bar 60 is effected by the cam mechanism 93, 105 and 105a previously used for oscillating the cutting blade 53.

The mechanism 109, 110, 111, together with the rope 117, pulleys 118, 119 and 119a and slide block 113, are replaced by a lever 111b secured to the shaft 108 and therefore operated by the cam mechanism 93, 105 and 105a. This lever is connected by a rod 111a to one arm of a bell crank lever 190, the other arm of which is connected by a link 191 to a further two-arm lever 192 which moves the downwardly projecting lug 193 of the slide bar 60. The fulcrums of the lever 192 and the bell crank lever 190 are both formed in a bracket 194 secured to the main frame 91 of the stitching machine. The operation of the previously described cam mechanism 93, 105 effects the backward and forward movement of the bar 60.

In Figs. 14 and 21 is shown a modified form of the device described in reference to Figs. 12 and 13.

As in the last described embodiment the combined needle-guide and strip-guide 77 is recessed to form a transverse slideway which receives a slide-bar 69 connected to actuating mechanism not shown but which is similar to that described in reference to Figs. 8 to 11. The slide bar 69 is formed with oblique slots one of which is indicated at 182 and is reciprocated transversely of the said guide 77.

A transverse clamping bar 70, placed in sliding engagement with one side of the slide bar 69, is provided with carrier lugs 183 adapted to engage the oblique slots 182 and impart movement to the clamping bar 70 at right angles to the needle guide 77. An auxiliary strip guide 58, associated with the curved face of the guide 77, has a transverse cutting edge 66a thereof aligned with the said clamping bar 70 so that the lower descending edge of the latter member will clamp the strip against the auxiliary strip guide adjacent the transverse edge thereof. The strip guide 58 is also provided with a further guiding extension 58a.

A cutting blade 67 is mounted on another slide bar 68 parallel to and closely adjacent the clamping bar 70 and is adapted to perform a reciprocatory transverse cutting movement along the cutting edge 66a of the auxiliary strip guide 58. A strip-feeding blade 57 is adapted to pass between the guides 77 and 58 as above described.

The operation of the cutting blade 67 is effected in precisely similar manner to that numbered 53 shown and described with reference to Figs. 8–11, while the clamping bar 70 is also operated from the cam mechanism 93, 105 and 105a, associated with the cutting mechanism, by means of a further arm secured to the shaft 108 and linked to a rod 111a, this mechanism is as already illustrated in regard to the embodiment shown in Fig. 19. The rod 111a is, however, in this construction connected at its upper end to one arm of a bell crank lever 195 by a lost-motion connection 196, the other arm of the bell crank lever 195 being linked by the rod 197 to the slide bar 69.

The arrangement operates as follows: upon the timed operation of the cam mechanism 93, 105 and 105a the rod 111a is caused to be drawn downwardly, at the same time as the cutting blade 67 commences to traverse the guide block 77. This downward movement of the rod 111a allows the bell crank lever 195 to rock under the action of the spring 198, and thus to effect the movement of the slide bar 69 which, in turn, causes the clamping of the backing material. The slow connection allows the rod 111a to complete its downward movement under the control of the cam mechanism 93, 105 and finally return and in its last stage of movement to rock the bell crank 195 and thus lift the clamping bar 70.

In operation of the last described embodiment of the invention, the backing material such as gauze, tapes or banding is fed between the guide members 77 and 58 and so positioned to receive and be stitched to the sections or signatures of a book.

When the last signature of a book is stitched, transverse movement is imparted to the slide bar 69 thus causing the clamping bar 70 to descend and hold the backing material 9 firmly against the guide 58 adjacent the cutting edge 66a. The cutting blade 67 is then moved transversely of the backing strip 9 and so severs the latter.

In due course the strip feeding blade 57 is actuated to feed forward the strip 9 and so position it for the assembling and stitching of the following book.

The alternative constructions of the backing strip severing device described in Figs. 12, 13, 14 and 15 may readily be incorporated in the automatically actuated and timed mechanism described in reference to Fig. 8 and it is not considered necessary in reference to these figures to show and describe in detail the actuating and timing mechanism.

In the embodiments of the invention described in reference to Figs. 1 to 11 and 14, 15, the movement of the severing member can be timed to perform either one strip severing operation in each reciprocatory movement or a strip severing operation in each half of each reciprocatory movement. Such alternative operation of the strip severing member is merely a matter of timing the actuating mechanism shown in the drawings.

Moreover, in the embodiments of the invention described in reference to Figs. 1 to 8 and 14 and 15, the severing member could be arranged to perform a working or cutting movement during each portion of its reciprocatory movement.

It will be obvious that although the backing material is generally described as a strip the width of the strip may equal or even exceed that of the back of the book-pad.

We claim:

1. A book-binding machine for producing a continuously stitched multi-book block each book of which has attached thereto at least one backing strip which is free of the adjacent books, comprising means for stitching the books to said backing strip, a severing device comprising a carrier adapted to move transversely of said backing material, a cutting blade mounted on said carrier, slotted guides, means for reciprocating said cutting blade in the slots in said guides, means for feeding the backing material between said guides to pass through the path of travel of the cutting blade, means for mechanically actuating the said cutting blade, and means for automatically timing the actuation of the said cutting blade.

2. A book-binding machine for producing a continuously stitched multi-book block each book of which has attached thereto at least one backing strip which is free of the adjacent books, comprising means for stitching the books to said backing strip, a severing device comprising a cutting blade, means for imparting vertical movement to the said cutting blade relatively to the backing material, a guide member associated with said severing device and having a transverse cutting edge positioned immediately below said cutting blade, means for automatically controlling the movement of the said cutting blade, and means for feeding the said backing material into position to receive the subsequently stitched book.

3. A book-binding machine for producing a continuously stitched multi-book block each book of which has attached thereto at least one backing strip which is free of the adjacent books, comprising means for stitching the books to said backing strip, a severing device comprising a carrier adapted to move transversely of said backing material, a cutting blade mounted on said carrier, a clamping member associated with said cutting blade, and adapted to move vertically relatively to the backing material, an auxiliary guide member having a transverse edge positioned immediately below the said clamping member, means for imparting movement to the said clamping member whereby the backing material is held between the said clamping member and the said auxiliary guide, means for imparting transverse movement to the said cutting blade to contact with and sever the clamped backing material, means for feeding the said backing material into position to receive the subsequent book to be assembled, and means for automatically timing the actuation of the said severing device in accordance with the operation of the said book-binding machine.

4. A book-stitching machine comprising, in combination, a machine frame, a stitcher head mounted on said frame, a backing strip guide associated with said stitcher head, a sheet-carrier adapted to position book-sections beneath said stitcher head, a book-pad slideway to receive said book-sections when stitched, runways to support section blocks placed between the adjacent books of the book-pad, rails mounted transversely above said book-pad slideway, a travelling blade carrier mounted on said rails, a severing blade secured to said blade carrier, means for imparting reciprocatory movement to said blade carrier and said blade, means for registering said blade with said backing strip at the requisite point of severance, and means for automatically timing the actuation of the said severing blade.

5. A book-stitching machine comprising, in combination, a machine frame, stitcher heads mounted on said machine frame, a backing strip guide associated with said stitcher heads, a sheet-carrier adapted to position book sections for stitching beneath said stitcher heads, a book-pad slideway adapted to receive said stitched book-sections, means for supplying a continuous strip of backing material to the said book-sections during the stitching thereof, runways to support grooved section blocks interposed between the adjacent books of the stitched book-pad, slidable guide rails mounted transversely above said book-pad slideway, a travelling blade carrier mounted on said slidable guide rails, a severing blade secured to said blade carrier, means for imparting reciprocatory movement to said blade carrier and severing blade, means for registering said blade with the backing strip at the requisite point of severance thereof, and means for timing the movement of the said blade carrier in accordance with the movement of the said sheet carrier.

6. A book-stitching machine comprising, in combination, a machine frame, stitcher heads mounted on said machine frame, slotted pivotal arms, a sheet carrier mounted on said arms and adapted to position book sections for stitching beneath said stitcher heads, means for positioning a continuous backing strip upon said book sections during the stitching thereof, a slideway to receive the progressing book-pad formed by the said book sections when stitched, runways to support grooved section blocks placed between the books of the said book-pad, bracket supports mounted above said slideway, cradle members slidably mounted on said bracket supports, transverse guide rails supported by said cradles, a blade carrier slidably mounted on said slide rails, a cutting blade attached to said blade carrier, a pilot member associated with said cutting blade to register the latter member with the backing strip at the requisite point of severance, actuating mechanism for imparting a reciprocatory movement to said blade carrier, means for connecting said actuating mechanism to the said sheet-carrier, and means for automatically timing the connection of said actuating mechanism and sheet carrier.

7. In a book-stitching machine as claimed in claim 6 means for actuating the severing device, comprising an arm mounted on a pivotal stub-shaft and connected to the blade carrier, a second arm mounted on said pivotal shaft and linked to one extremity of a slidable connecting rod having its further extremity U shaped, a shouldered bolt slidably mounted in said U shaped extremity of the connecting rod, a spring anchored to said rod and adapted to urge the said bolt into a slot in one of the sheet carrier arms, a de-coupling member adapted to remove the said bolt from the slot in the said sheet carrier arm, and means for actuating the said de-coupling member in accordance with the progression of the stitched book-pad.

8. A book-stitching machine incorporating automatically actuated means for severing the backing material for a stitched book-pad and including a machine frame, a movable sheet-carrier, a slideway mounted on said frame to support a progressing book-pad, slotted runways positioned above said slideway and adapted to support the extremities of grooved section blocks interposed between the books of the book-pad, a severing blade carrier slidably mounted above said book-pad slideway, an actuating lever connected to said carrier and adapted to impart reciprocatory movement thereto, means for coupling said actuating lever to the said sheet-carrier, a de-coupling member adapted to release the connection between the said sheet carrier and actuating arm, a controlling lever connected to said de-coupling member, a pin carried by said controlling lever and adapted when the mechanism is de-coupled to project through a slot in one of the said runways in the path of the foremost section block carried by the progressing book-pad, means whereby said de-coupling member is withdrawn from its de-coupling position when the pin of the controlling lever is displaced from the path of the foremost section block, pivotal retaining lugs mounted above said runways to engage and temporarily hold against movement the advancing book-pad, means carried by said blade carrier to release said book-pad from said retaining lugs, and means for re-setting said controlling lever in the de-coupling position.

9. A book-stitching machine comprising means for stitching book sections to a strip of book-backing material, a main guide for book-backing material, an auxiliary guide for said material associated with said main guide, a strip severing member slidably supported in said main guide, means for imparting reciprocatory movement to the said severing member transverse to the said backing material to contact with and sever the latter, means for timing the operative movement of the said severing member in accordance with the number of stitched book-sections and means for positioning the severed backing material to receive the book-sections subsequently to be stitched.

10. A book-stitching machine comprising a machine frame, means mounted on said frame for stitching books to a strip of book backing material, a main guide for said book backing material mounted in said frame, a slotted auxiliary guide associated with said main guide, a blade holder mounted in the said main guide, a severing blade attached to said blade holder, guide bars mounted on said machine frame, a slide block mounted on said guide bars, a connecting member attached to both said slide block and said blade holder, means for imparting reciprocating movement to said slide block whereby said severing blade is moved transversely of and contacted with the backing material, and means for mechanically positioning the said backing material to receive the book-sections subsequently to be stitched.

11. A book-stitching machine comprising a machine frame, means mounted on said frame for stitching books to a strip of book backing material, a main guide for said book backing material mounted on said frame, an auxiliary guide associated with said main guide and provided with a transverse slot, a blade holder slidably mounted in said main guide, a severing blade secured to said blade-holder and arranged to traverse the transverse slot in the said auxiliary guide, means for imparting a reciprocatory movement to said severing blade and blade holder, a feeding blade adapted to engage the backing material and position the latter in position to receive the book-sections subsequently stitched, means for actuating the said feeding blade and associated means for timing the actuation of the said feeding blade in accordance with the number of stitching operations.

12. A book-stitching machine comprising a machine frame, means mounted on said frame for stitching books to a strip of book backing material, a main guide for said book backing material mounted on said frame, an auxiliary guide associated with said main guide and provided with a transverse slot, a reciprocatory blade holder associated with said main guide, a severing blade secured to said holder and adapted to project into the said transverse slot, guide bars supported by said machine frame, a slide block mounted on said guide bars, pulleys associated with said guide bars, a cable passed around the said pulleys and attached to the said slide block and said blade holder, means for reciprocating the said slide block whereby operative movement is imparted to the said severing blade, means for positioning the backing material to receive the next stitched book-sections and associated means for timing in accordance with the book-stitching operation the severance of the said backing material.

13. In combination, a book-stitching machine, an auxiliary frame associated with said book-stitching machine, a severing device provided in said stitching machine for mechanically severing the connections between the adjacent books of a stitched book-pad, means provided in said stitching machines for tensioning the fed backing material, means for releasing the tension of the said backing material, a cam-shaft journalled in said auxiliary frame, a drive shaft journalled in said machine frame, means for driving said cam-shaft from said machine drive shaft, driving eccentrics mounted on said cam-shaft, a timing shaft journalled in said auxiliary frame, means for rotating said timing shaft step by step in accordance with the movement of the said cam-shaft, slotted timing discs mounted on said timing shaft, means for controlling from one of said discs the backing material tensioning means, means for controlling from one of said discs the actuation of said severing device, and means for ensuring the continued feed and correct positioning of said backing material.

14. In combination, a book-stitching machine, adapted to produce a stitched book-pad, an auxiliary frame associated with said book-stitching machine, means for supplying a continuous backing strip to the stitched book-pad, a severing device provided in said stitching machine to sever mechanically the backing strip between the adjacent books of the said book-pad, means for tensioning the said backing strip, means for automatically releasing the tension applied to the said backing strip, a strip positioning member associated with said strip severing member and adapted to position the severed backing strip to receive the book-sections subsequently stitched, a timing shaft journalled in said auxiliary frame, means for rotating said timing shaft step by step in accordance with the stitching operations of the said stitching machine, slotted timing discs mounted on said timing shaft, means for controlling from one of said discs the said strip tensioning means, means for controlling from one of said discs the actuation of the said strip severing device, and means for controlling from one of said discs the actuation of the said strip positioning member.

15. A severing device for book-backing material as claimed in claim 14 comprising a main backing strip guide formed with a transverse slideway, an auxiliary backing strip guide associated with said main guide and provided with a transverse notch, a blade carrier adapted to move in said slideway, pivotal arms positioned above said strip guide, a transverse bar held by said arms, a strip tensioning bridge mounted upon said arms, a curved strip positioning blade depending from said arms, strip tensioning bars associated with said tensioning bridge, tripping arms associated with said tensioning bars and adapted to engage said transverse bar, an actuating rod linked to the timed drive and adapted to make a lost motion connection with said transverse bar, and a second actuating rod linked to the timed drive and adapted to make a lost motion connection with said transverse bar.

16. A severing device for book-backing material as claimed in claim 14, comprising a main strip guide provided with a slotted guideway, a carrier slide-bar seated in said strip-guide and provided with oblique slots, a severing blade provided with lugs adapted to engage slots in said slide-bar, an auxiliary strip guide associated with said main strip guide and formed with a transverse cutting edge positioned immediately beneath said severing blade, means for imparting transverse movement to the said slide-bar and vertical movement to said severing member relatively to said backing strip and means for positioning the severed backing strip to receive the book-sections subsequently to be stitched.

17. A severing device for book-backing material as claimed in claim 14, comprising a main strip guide, an auxiliary strip guide associated with said main strip guide, a transverse clamping bar slidably mounted in said strip guide, a transverse slide bar adapted when moved to impart vertical movement to said clamping bar, a combined clamping and cutting edge positioned immediately below said clamping bar and forming part of said auxiliary strip guide, a blade carrier supported by said main strip guide, a severing blade secured to said blade carrier, means for feeding said backing material between said guide members, means for reciprocating said blade transversely of said backing material and means for positioning the severed backing material to receive the book sections subsequently assembled.

18. A book-binding machine for producing a continuously stitched multi-book block each book of which has attached thereto at least one backing strip which is free of the adjacent books, including in combination a stitching head, a swinging sheet carrier to feed the work to said stitching head, a slideway to support the stitched book-pad, means for guiding a continuous backing strip into position for attachment to said book-pad by stitches during the stitching thereof, and means for severing mechanically said backing strip into lengths requisite for each book during the continuous formation of the book-pad.

19. A book-binding machine for producing a continuously stitched multi-book block each book of which has attached thereto at least one backing strip which is free of the adjacent books, including in combination a stitching head, a swinging sheet carrier to feed the work to said stitching head, a slideway to support the stitched book-pad, means for guiding a continuous backing strip into position for attachment to said book-pad by stitches during the stitching thereof, a movable cutting member arranged to contact with and sever the backing strip, a guide member slotted to receive and provide a path for the free edge of said severing member, and means for imparting movement to said severing member to sever the strip into lengths requisite for each book during the continuous formation of the book-pad.

20. A book-stitching machine for producing a continuously stitched multi-book block each book of which has attached thereto at least one backing strip which is free of the adjacent books, including in combination a stitching head, a swinging sheet carrier to feed the work to said stitching head, a slideway to support the stitched book-pad, means for guiding a continuous backing strip into position for attachment to said book-pad by stitches during the stitching thereof, a movable cutting member arranged to contact with and sever the backing strip, and means for moving said cutting member transverse to said backing strip to sever the latter into lengths requisite for each book during the continuous formation of the book-pad.

21. A book-binding machine for producing a continuously stitched multi-book block each book of which has attached thereto at least one backing strip which is free of the adjacent books, including in combination a stitching head, a swinging sheet carrier to feed the work to said stitching head, a slideway to support the stitched book-pad, means for guiding a continuous backing strip into position for attachment to said book-pad by stitches during the stitching thereof, a movable cutting member arranged to contact with and sever said backing strip, and means for imparting reciprocatory movement to said severing member to sever the strip into lengths requisite for each book during the continuous formation of the book-pad.

22. A book-binding machine for producing a continuously stitched multi-book block each book of which has attached thereto at least one backing strip which is free of the adjacent books, including in combination a stitching head, a swinging sheet carrier to feed the work to said stitching head, a slideway to support the stitched book-pad, means for guiding a continuous backing strip into position for attachment to said book-pad by stitches during the stitching thereof, a movable cutting member arranged to contact with and sever said backing strip, means for imparting a reciprocatory movement to said severing member to sever said backing strip into lengths requisite for each book during the formation of the book-pad, and means for automatically timing the movement of said severing member in accordance with the book-stitching operation.

23. A book-binding machine for producing a continuously stitched multi-book block each book of which has attached thereto at least one backing strip which is free of the adjacent books, including in combination a stitching head, a swinging sheet carrier to feed the work to said stitching head, a slideway to support the stitched book-pad, means for guiding a continuous backing strip into position for attachment to said book-pad by stitches during the stitching thereof, a movable cutting member arranged to contact with and sever said backing strip, means for imparting reciprocatory movement to said cutting member, means for guiding said cutting member between the adjacent books of said pad, and means for automatically controlling the movement of said cutting member in accordance with the movement of said book-pad.

24. A book-binding machine for producing a continuously stitched multi-book block each book of which has attached thereto at least one backing strip which is free of the adjacent books, comprising a stitching head, a swinging sheet carrier for presenting the closed edge of a folded sheet to the stitching head for the insertion of stitches in said closed edge by means of which the folded sheet is attached to a previously stitched folded sheet, a slideway for supporting the stitched folded sheets in juxtaposed, book-like formation, means for guiding a continuous backing strip between the stitching head and the closed edge of a folded sheet brought into stitching position by the swinging sheet carrier so that the stitches inserted in the closed edge of the folded sheet will pass through the backing strip to attach each stitched sheet to the backing strip, and means for mechanically severing the backing strip between groups of assembled stitched sheets to form individual books.

25. A book-binding machine for producing a continuously stitched multi-book block each book of which has attached thereto at least one backing strip which is free of the adjacent books, comprising a stitching head, means for guiding a continuous backing strip into a position to be stitched, a swinging sheet carrier for bringing the closed edge of a folded sheet into a position to have stitches inserted in the closed edge by said stitching head and thereby be attached to said backing strip alongside of a previously attached sheet in book formation, and means for mechanically severing the backing strip at predetermined intervals during the assembling and stitching of sheets to form individual books containing predetermined numbers of assembled sheets.

26. A book-binding machine for producing a continuously stitched multi-book block each book of which has attached thereto at least one backing strip which is free of the adjacent books, comprising a stitching head, a swinging sheet carrier for presenting the closed edge of a folded sheet to the stitching head for the insertion of stitches in said closed edge by means of which the folded sheet is attached to a previously stitched folded sheet, a slideway for supporting the stitched folded sheets in juxtaposed, book-like formation, means for guiding a continuous backing strip between the stitching head and the closed edge of a folded sheet brought into stitching position by the swinging sheet carrier so that the stitches inserted in the closed edge of the folded sheet will pass through the backing strip to attach each stitched sheet to the backing strip, and means for mechanically severing the backing strip at predetermined intervals during the assembling and stitching of sheets to form individual books containing predetermined numbers of assembled sheets.

27. A book-binding machine for producing a continuously stitched multi-book block each book of which has attached thereto at least one backing strip which is free of the adjacent books, comprising a stitching head, means for guiding a continuous backing strip into a position to be stitched, a swinging sheet carrier for bringing the closed edge of a folded sheet into a position to have stitches inserted into the closed edge by said stitching head and thereby be attached to said backing strip alongside of a previously attached sheet in book formation, and means for mechanically severing the backing strip between groups of assembled stitched sheets to form individual books.

OSCAR KLEINSCHMIT.
OSKAR MÜLLER.